United States Patent [19]

Otani

[11] Patent Number: 5,530,717

[45] Date of Patent: Jun. 25, 1996

[54] SMOOTH SPECTRUM SPREADING WITH A SMALL SPREADING FACTOR

[75] Inventor: Susumu Otani, Tokyo, Japan

[73] Assignee: NEC Corporation, Tokyo, Japan

[21] Appl. No.: 274,437

[22] Filed: Jul. 13, 1994

[30] Foreign Application Priority Data

Jul. 14, 1993 [JP] Japan ................................. 5-173518

[51] Int. Cl.⁶ .................................................. H04B 1/707
[52] U.S. Cl. .................................................... 375/206
[58] Field of Search ...................................... 375/200, 205, 375/206; 370/18, 93; 380/9

[56] References Cited

U.S. PATENT DOCUMENTS

4,455,651  6/1984  Baran ...................... 370/104
5,204,877  4/1993  Endo et al. ............... 375/200

Primary Examiner—Stephen Chin
Assistant Examiner—Kevin Kim
Attorney, Agent, or Firm—Sughrue, Mion, Zinn, Macpeak & Seas

[57] ABSTRACT

For spectrum spreading with a small spreading factor N which may be four, an input bit sequence of an input bit rate fs is eventually converted into a serial data sequence of serial data of which each serial datum consists of N repetitions of N consecutive bits of the input bit sequence. By a shift register (19) operable at fs and a memory (23) operable at fs/4, the input bit sequence is first converted into N parallel bit sequences, which are converted into the serial data sequence by a selector (27) operable at Nfs.

20 Claims, 5 Drawing Sheets

SMOOTH SPECTRUM SPREADING WITH A SMALL SPREADING FACTOR

BACKGROUND OF THE INVENTION

This invention relates to spectrum spreading which is preferable for use in a satellite communication network including earth stations equipped with small diameter antennas as in a VSAT satellite communication network. More particularly, this invention relates to a spectrum spreading method, a spectrum spreading device, and a spectrum spreading transmitter in each of which use is made of spectrum spreading of the type described.

Spectrum spreading of this type is already known. For example, "satellite communications system and apparatus" are disclosed in U.S. Pat. No. 4,455,651 issued to Paul Baran and assigned to Equatorial Communications Company, California, the United States of America. This satellite communication network of Baran provides a low cost satellite communication network. For this purpose, a small diameter antenna is used in each earth station for transmission and reception of radio signals. In order to trade off deterioration inevitably caused by the small diameter antenna to communication quality, a spectrum spreading technique is used on producing a transmission signal. In the earth station of the Baran satellite communication network, transmission data are spectrum spread at a spreading factor, namely, a ratio of a chip rate to an input bit rate, of the order of 256 and then subjected to BPSK modulation for transmission as the transmission signal to a satellite station.

By the VSAT satellite communication network which is used in practice in the United States of America and elsewhere, in which the input bit rate is about 64 Kbps, and in which the earth station is equipped with an antenna of a diameter of 1 meter with a transmission power of about 1 watt, it is possible without the spectrum spreading technique to provide a communication channel capable of insuring a sufficiently excellent communication quality to satisfy the FCC (Federal Communications Commission) standards. With the antenna diameter reduced to about 0.5 m, the VSAT satellite communication network would satisfy the FCC standards if the spectrum spreading technique is resorted to so as to reduce a spectrum power density off an antenna axis. In this event, a band spreading factor (hereafter referred to simply as the spreading factor) of at most about five (from four to eight) is sufficient in theory because the antenna has a gain difference of 6 dB, namely, 20 log (1/0.5) dB.

Spectrum of a spectrum spread signal will now be studied in connection with this small spreading factor. It will be assumed that the spreading factor is equal to four.

It is usual in this event to use four as a code length of spreading codes for use in spectrum spreading an input bit sequence into a spectrum spread signal. In order to reduce a peak spectrum power density, important is whether or not it is possible with the spreading codes of a four-bit code length to get the spectrum spread signal with a sufficiently smooth spectrum spreading characteristic.

Attention will be directed under the circumstances to spreading codes "0000" and "1111". These spreading codes provide two emission line spectra. The spectrum spread signal can not have a smooth spectrum. Spreading codes "1010" and "0101" also provide emission line spectra. With these spreading codes, an unevenness results in the spectrum spread signal. With spreading codes "1100" and "0011", emission line spectra again appear in the spectrum of the spectrum spread signal. When the spreading factor is four, there are ten other spreading codes. All of these spreading codes do not give a sufficiently smooth spectrum to the spectrum spread signal.

In the manner which will later be discussed more in detail, it has been necessary for smoothening the spectrum of the spectrum spread signal to use the spreading codes with their code length selected between 100 and 1,000. The spectrum spread signal, however, has a much widened signal bandwidth in this event. As a consequence, the transmission signal would objectionably give interference to adjacent signals when the satellite station is used in common.

SUMMARY OF THE INVENTION

It is consequently an object of the present invention to provide a spectrum spreading method capable of giving a sufficiently smooth spectrum to a spectrum spread signal even when a small spreading factor is used.

It is another object of this invention to provide a spectrum spreading method which is of the type described and which is suitable for use in a satellite communication network comprising earth stations equipped with small diameter antennas.

It is still another object of this invention to provide a spectrum spreading method which is of the type described and by which a spectrum spread signal is produced to have a small bandwidth spreading factor.

It is yet another object of this invention to provide a spectrum spreading method which is of the type described and by which a spectrum spread signal is produced to give little interference to other signals.

It is a different object of this invention to provide a spectrum spreading device to which it is possible to apply a spectrum spreading method of the type described.

It is a further different object of this invention to provide a spectrum spreading transmitter which comprises a spectrum spreading device of the type described.

Other objects of this invention will become clear as the description proceeds.

In accordance with an aspect of this invention, there is provided a method of spectrum spreading an input bit sequence of an input bit rate into a spectrum spread signal of a chip rate which is equal to N times the input bit rate, where N represents an integer which is equal at least to two, comprising the steps of: (A) serial to parallel converting the input bit sequence into N parallel bit sequences comprising in each of time slots N parallel bits in which N consecutive bits of the input bit sequence are arranged; (B) parallel to series converting the parallel bit sequences into a serial data sequence of serial data, each serial datum comprising $N^2$ bits in which the N parallel bits of each of the time slots are N times repeatedly arranged; (C) generating spreading codes of a code length of $N^2$ bits at the chip rate; and (D) spectrum spreading the serial data sequence by the spreading codes into the spectrum spread signal.

In accordance with a different aspect of this invention, there is provided a spectrum spreading device for spectrum spreading an input bit sequence of an input bit rate into a spectrum spread signal of a chip rate which is equal to N times the input bit rate, where N represents an integer which is equal at least to two, comprising: (A) serial to parallel converter means for converting the input bit sequence into N parallel bit sequences comprising N parallel bits in which N consecutive bits of the input bit sequence are arranged; (B)

parallel to series converter means for converting the parallel bit sequences into a serial data sequence of serial data, each serial datum comprising $N^2$ bits in which the N parallel bits of each of the time slots are N times repeatedly arranged; (C) code generator means for generating spreading codes of a code length of $N^2$ bits at the chip rate; and (D) spreader means for spectrum spreading the serial data sequence by the spreading codes into the spectrum spread signal.

In accordance with a further different aspect of this invention, there is provided a spectrum spreading transmitter for spectrum spreading an input bit sequence of an input bit rate into a spectrum spread signal of a chip rate and for transmitting the spectrum spread signal as a transmission signal, with the chip rate rendered equal to N times the input bit rate, where N represents an integer which is equal at least to two, the spectrum spreading transmitter comprising: (A) serial to parallel converter means for converting the input bit sequence into N parallel bit sequences comprising in each of time slots N parallel bits in which N consecutive bits of an input bit sequence are arranged; (B) parallel to series converter means for converting the parallel bit sequences into a serial data sequence of serial data, each serial datum comprising $N^2$ bits in which the N parallel bits of each of the time slots are N times repeatedly arranged; (C) code generator means for generating spreading codes of a code length of $N^2$ bits at the chip rate; (D) spreader means for spectrum spreading the serial data sequence into the spectrum spread signal; (E) modulator means for modulating a carrier signal by the spectrum spread signal into a modulated signal; and (F) transmitter means for transmitting the modulated signal as the transmission signal.

DESCRIPTION OF THE PREFERRED EMBODIMENT

Figure 1:
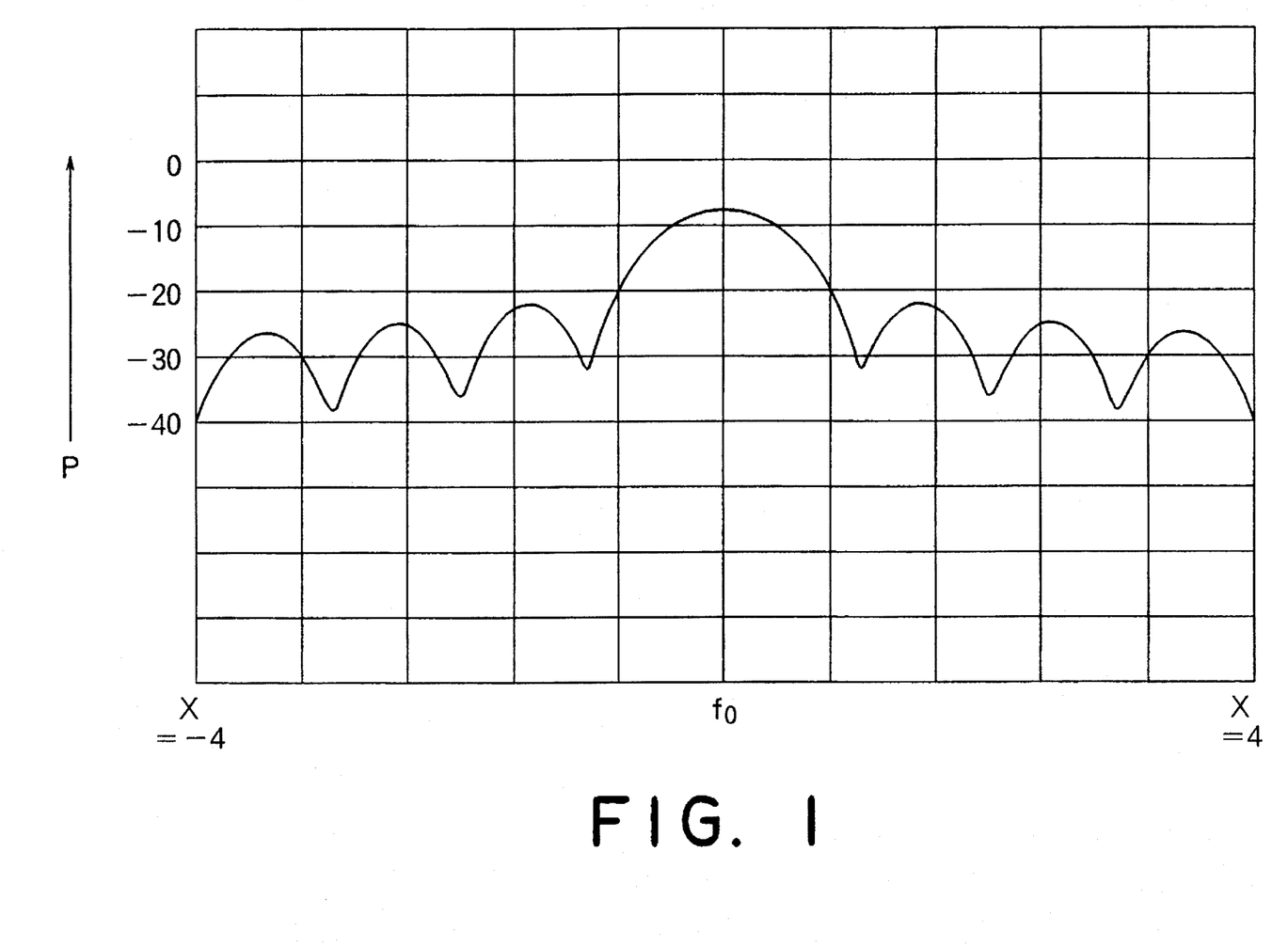
FIG. 1 schematically shows for reference a spectrum power density of a BPSK signal without spectrum spreading of an input bit sequence.
Figure 2:
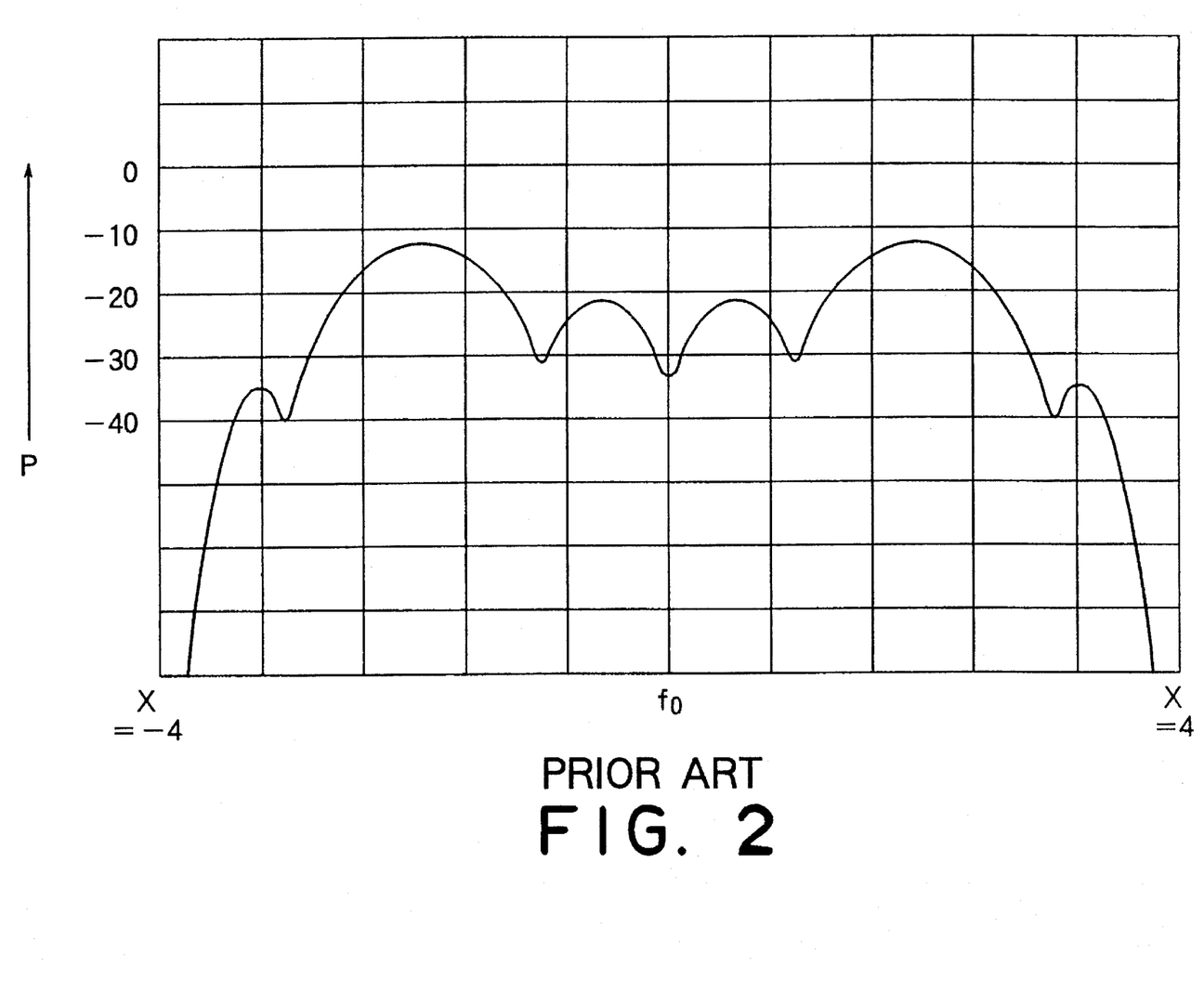
FIG. 2 schematically illustrates a spectrum power density of a spectrum spread and BPSK modulated signal obtained by a conventional spectrum spreading method with a spreading factor of four.

Referring to FIGS. 1 and 2, a spectrum power density of a spectrum spread signal will first be described in order to facilitate an understanding of the present invention. It is assumed that a number of four is used as a spreading factor which is mentioned hereinabove and will become clear as the description proceeds. In FIG. 1, the spectrum power density is illustrated for use as a reference without an input bit sequence subjected to spectrum spreading.

In each of FIGS. 1 and 2, the spectrum power density is scaled along the ordinate as indicated by P in dBm/Hz. The abscissa shows a frequency band of a BPSK modulated signal between a symbol rate X of plus four and minus four with a center frequency f0 at the center. The symbol rate of the BPSK modulated signal corresponds to an input bit rate of an input bit sequence from which the BPSK modulated signal is derived.

In FIG. 1 where the BPSK modulated signal is derived without the input bit sequence subjected to spectrum spreading, nulls appear at 1.25 scales of the frequency band. A highest peak appears at the center frequency. Each of two adjacent peaks is 13 dB lower than the highest peak in the manner known in the art.

In FIG. 2, the input bit sequence is spectrum spread with a spreading factor of four and then subjected to BPSK modulation. In this case, two maximum peaks appear on both sides of the center frequency. Next high peaks appear between the maximum peaks nearer to the center frequency. The maximum peaks have a height which is not appreciably different from the highest peak depicted in FIG. 1. The next high peaks are 9 dB lower than the maximum peaks.

In FIGS. 1 and 2, it is understood that use of spectrum spreading reduces a peak to peak difference by 3 dB. It is desirable when the signal band is four times widened that the peak to peak difference should be reduced to one by four (by 6 dB). Use of the spreading factor of four, however, reduces the peak to peak difference only to 3 dB, namely, only to a half of the desired value. This makes it difficult to satisfy the FCC standards for the out of axis antenna radiation mentioned heretobefore. This is the reason why the spreading factor of 256 is used by Baran as described in the foregoing even at the cost of a possibly increased amount of interference.

Figure 3:
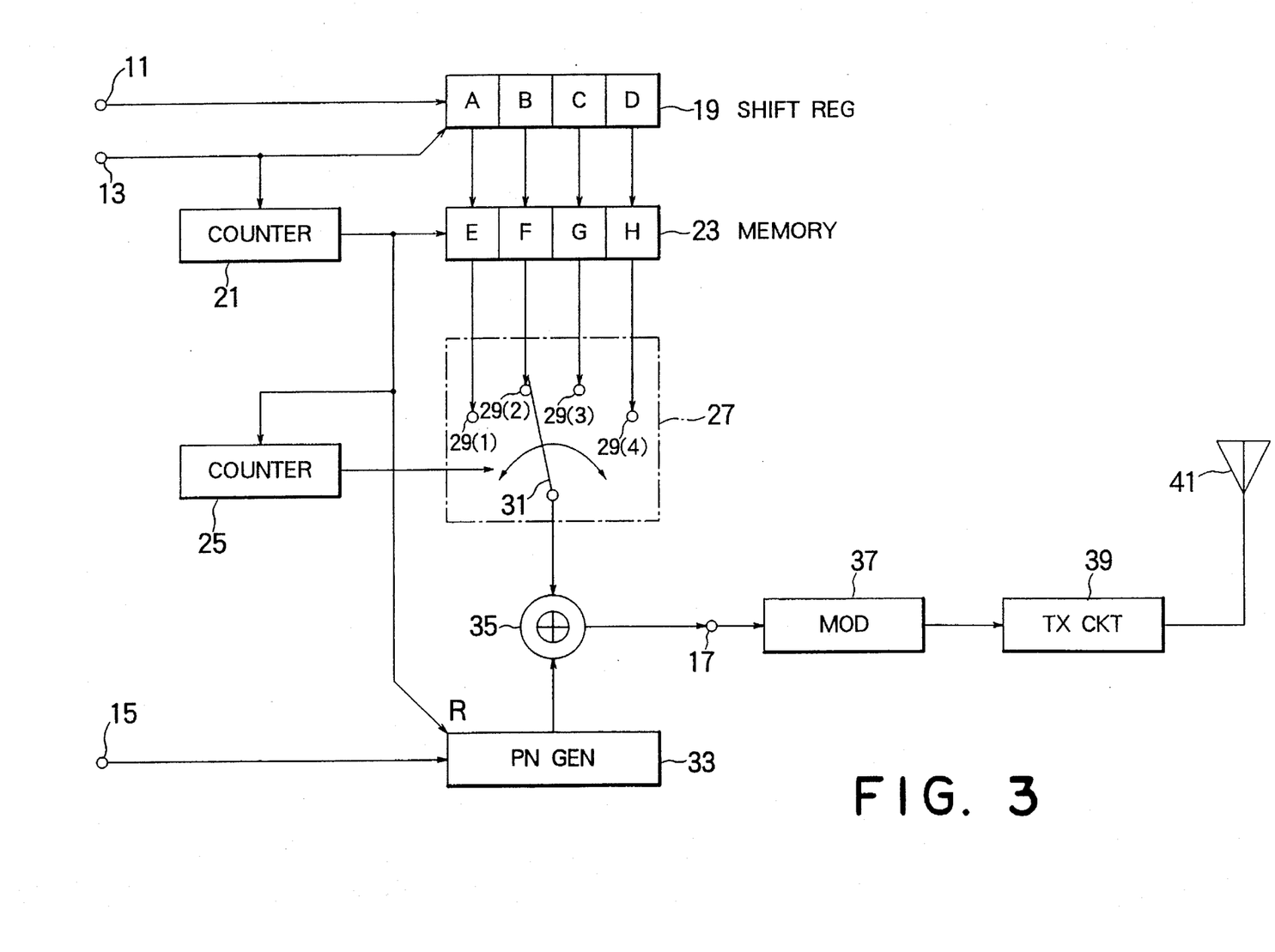
FIG. 3 is a block diagram of a spectrum spreading transmitter according to an embodiment of the instant invention.
Figure 4:
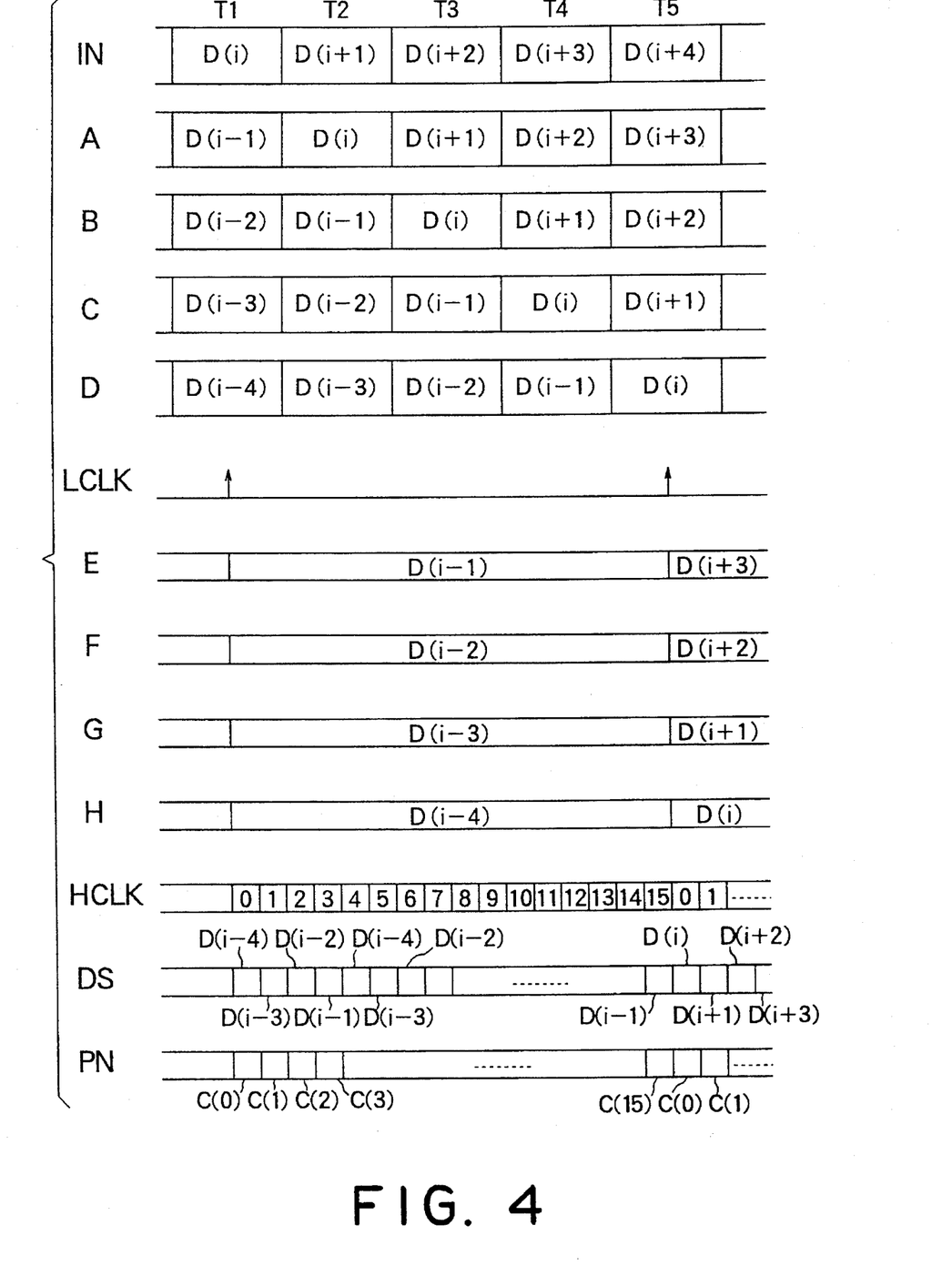
FIG. 4 schematically shows a time chart for use in describing operation of a spectrum spreading device which is used in the spectrum spreading transmitter depicted in FIG. 3.

Referring now to FIGS. 3 and 4, the description will proceed to a spectrum spreading transmitter which comprises a spectrum spreading device according to a preferred embodiment of this invention. In the example being illustrated, the spectrum spreading device is operable with a spreading factor N of four.

In FIG. 3, the spectrum spreading device has a device input terminal 11, a shift clock input terminal 13, a chip clock input terminal 15, and a device output terminal 17. The device input terminal 11 is supplied with an input bit sequence IN of an input bit rate fs.

In the manner depicted in FIG. 4 along a first or top row labelled IN together with first through fifth time slots T1 to T5, the input bit sequence is a sequence of i-th through (i+4)-th and other bits D(i), D(i+1), ..., D(i+4), and so forth. The input bit sequence is delivered to a serial shift register 19 comprising first through fourth shift register stages A, B, C, and D in correspondence to the spreading factor of four. The register stages have first through fourth stage output terminals.

A shift clock signal SCLK is supplied to the shift clock input terminal 13 at the input bit rate in synchronism with the input bit sequence. The shift clock signal defines the time slots for the input bit sequence and for the shift register 19 and is used as shift pulses in the shift register 19. It is possible to understand the shift clock input terminal 13 as shift clock generator means for generating the shift clock signal.

It will be assumed at the first time slot that an (i−1)-th bit D(i−1) is supplied to the first shift register stage A and is stored therein by the shift clock signal in the manner depicted in FIG. 4 along a second row labelled A. In the first time slot, such bits of the input bit sequence are shifted from the first register stage to the fourth register stage. The second to the fourth register stages are therefore loaded with (i−2)- th through (i–4)-th bits D(i–2) to D(i–4) as illustrated along third through fifth rows labelled B, C, and D. In this manner, four or N consecutive bits of the input bit sequence are shifted in the shift register 19 as a shifted datum at each of the time slots.

Connected to the shift clock input terminal 13, a first counter 21 divides the shift clock signal by ¼ or 1/N and produces a low rate clock signal LCLK of a lower rate fs/4. The first counter 21 therefore serves as a first divider for dividing the shift clock signal by 1/N to produce the low rate clock signal.

The low rate clock signal is exemplified in FIG. 4 along a sixth row labelled LCLK with its clock pulses indicated by short upright arrows. It will be noted that the clock pulses are produced with a delay relative to the time slots depicted along the first row IN together with the bits D(i) and so on of the input bit sequence IN. The low rate clock signal is nevertheless in synchronism with the shift clock signal, because the shift clock signal is divided into the low rate clock signal.

A memory unit 23 comprises first to fourth memory elements E, F, G, and H having first to fourth element output terminals, respectively. The low rate clock signal is supplied simultaneously to the first to the fourth memory elements to serve as load pulses at the lower rate. The first to the fourth memory elements are connected to the first through the fourth stage output terminals of the shift register 19, respectively. From the shift register 19, each shifted datum is stored in the memory unit 23 as a stored datum of first to fourth or n-th stored bits.

FIGS. 3 and 4 will more particularly be referred to. The shifted data are transferred from the shift register 19 to the memory unit 23 once in four or N time slots, which may be called a longer time interval or slot. Throughout one of such longer time slots that is the first through the fourth time slots T1 to T4 in the example being illustrated, the (i–1)-th bit D(i–1) is transferred from the first register stage A to the first memory element E and kept in the first memory element in the manner depicted in FIG. 4 along a seventh row labelled E. Likewise, the (i–2)-th through the (i–4)-th bits D(i–2), D(i–3), and D(i–4) are kept in the second to the fourth memory elements as illustrated along seventh to tenth rows labelled F, G, and H.

Timed by the low rate clock signal, the stored data are produced from the first to the fourth or the N-th element output terminals as N parallel bit sequences. At each longer time slot, the parallel bit sequences comprise N parallel bits into which the N consecutive bits of the input bit sequence are rearranged. As a consequence, a combination of the shift clock generator means (13), the shift register 19, the first divider (21), and the memory unit 23 is understood as series to parallel converter means for converting the input bit sequence into the N parallel bit sequences. Each longer time interval or slot is referred to simply as a time slot in connection with the parallel bit sequences and with the series to parallel converter means (13, 19, 21, 23).

In FIG. 3, the low rate clock signal is supplied furthermore to a second counter 25 having a full count of 16, namely, $N^2$. Loaded by each clock pulse of the low rate clock signal, the second counter 25 counts up from zero up to fifteen. The second counter 25 consequently serves as a second divider for dividing the low rate clock signal by sixteen or $N^2$ to produce a high rate clock signal HCLK at a higher rate of Nfs in synchronism with the low rate clock signal.

In FIG. 4, the high rate clock signal is depicted along an eleventh row labelled HCLK by 0, 1, 2, ..., 15, 0, 1, ...

It is possible to supply the shift clock signal from the shift clock input terminal 13 directly to the second divider (25) in producing the high rate clock signal by division by N. Supply of the low rate clock signal is nevertheless preferred in order to insure synchronism between the high and the low rate clock signals.

In FIG. 3, a selector 27 is depicted as a rotary switch merely for convenience of illustration and comprises first to fourth selector terminals 29(1), 29(2), 29(3), and 29(4) which will either collectively or individually designated by a simple reference numeral 29 without addition thereto of the suffixes enclosed with the parentheses. Such selector terminals 29 are supplied from the memory unit 23 with the first to the N-th stored bits. Depicted as a rotatable arm, a selector element 31 is put into operation in response to the high rate clock signal to select the first to the fourth or the N-th selector terminals 29 cyclically four or N times while the first to the N-th stored bits are supplied to the selector terminals 29 from the first to the N-th element output terminals of the memory unit 23.

As a consequence, the selector 27 produces a serial data sequence DS of serial data. Each serial datum comprises sixteen or $N^2$ bits in which the N parallel bits of each time slot of the shift register 19 are N times repeatedly arranged in the manner illustrated in FIG. 4 along a twelfth row labelled DS by bits D(i–4), D(i–3), D(i–2), D(i–1), D(i–4), D(i–3), D(i–2), ..., and D(i–1); or bits D(i), D(i+1), D(i+2), D(i+3), ... In this manner, the selector 27 serves as parallel to series converter means for converting the N parallel bit sequences into a series data sequence in cooperation with the second divider (25).

The chip clock input terminal 15 is supplied with a chip clock signal CCLK of the chip rate fc which is equal to 4 fs or Nfs. Supplied with the low rate clock signal at a reset terminal R and with the chip clock signal, a spreading code generator (PN GEN) 33 generates spreading or psuedorandom (PN) codes PN of a code length of sixteen or $N^2$ bits at the higher clock rate in phase synchronism with the serial data sequence produced from the selector 27. In the example being illustrated, the spreading codes are repetitions of a partial code sequence C(0), C(1), C(2), C(3), ..., and C(15) depicted in FIG. 4 along a thirteenth or bottom row labelled PN. It should be noted that the code length of the spreading codes is $N^2$ bits long despite the fact that the spreading factor is equal to N.

Supplied with the serial data sequence from the selector 27 and with the spreading codes from the spreading code generator 33, an Exclusive OR circuit 35 serves as spreader means for spectrum spreading the serial data sequence by the spreading codes to deliver a spectrum spread signal to the device output terminal 17. Connected to the device output terminal 17, a modulator (MOD) 37 generates a carrier signal and subjects the carrier signal to BPSK modulation by the spectrum spread signal to produce a BPSK modulated signal. Giving a desired transmission frequency, an appropriate frequency bandwidth, and a suitable level to the modulated signal, a transmitter circuit (TX CKT) 39 produces a transmission signal. In the illustrated example, the transmission signal feeds an antenna 41 and is transmitted therefrom to a satellite station (not shown).

Figure 5:
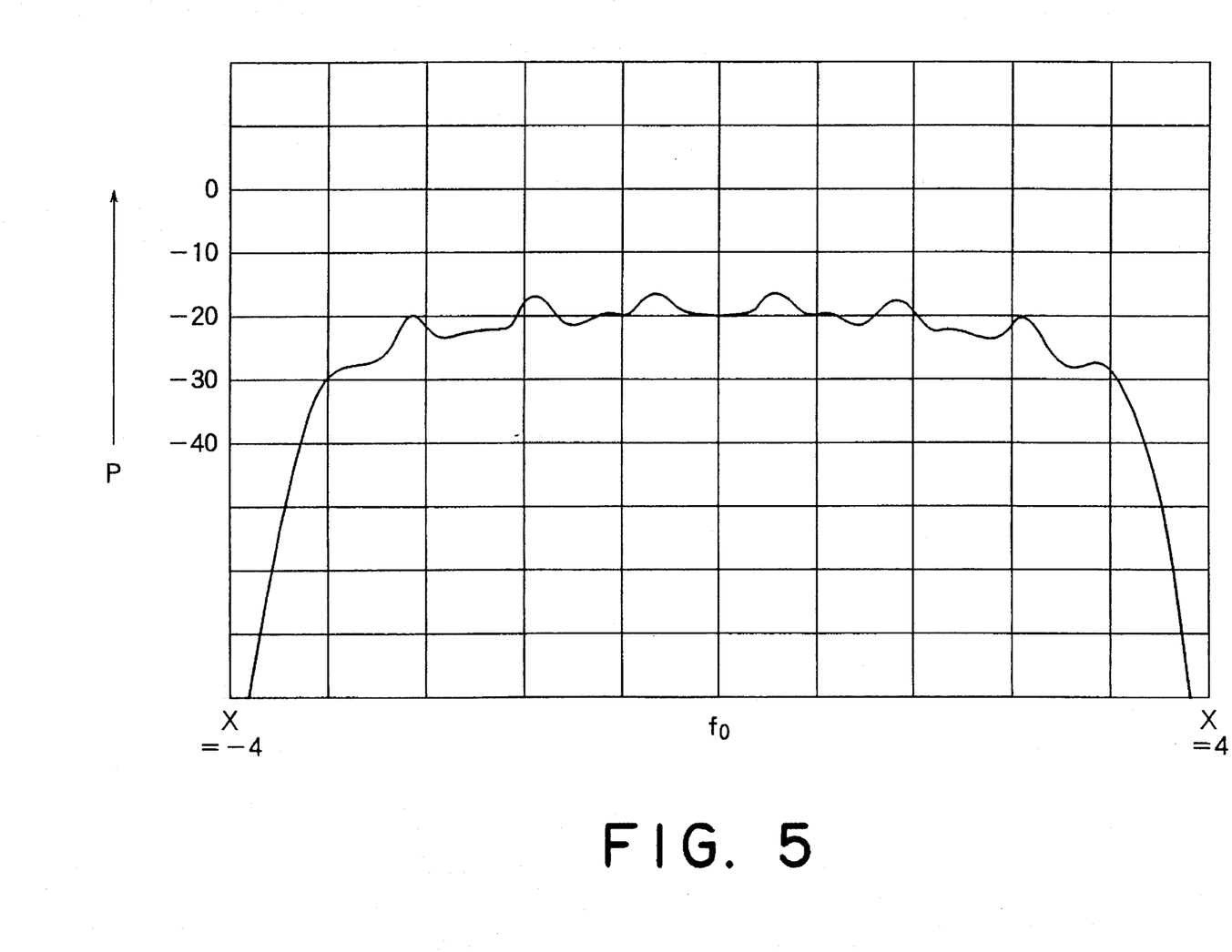
FIG. 5 schematically shows a spectrum power density of a BPSK modulated signal which is produced by the spectrum spreading transmitter depicted in FIG. 3 with a spreading factor of four.

Referring now to FIG. 5 which is scaled similar to FIG. 1 or FIG. 2, the BPSK signal is produced by the modulator 27 with smooth spectrum spreading when use is made of the spectrum spreading device illustrated with reference to FIGS. 3 and 4. In addition, the BPSK signal is possessed of a peak spectrum power density which is about. 6 dB lower than the BPSK signal described in conjunction with FIG. 1 and about 3 dB lower than the BPSK signal described with reference to FIG. 2. This smooth spectrum is rendered possible because of the following reasons.

The input bit sequence is not spectrum spread as it stands. Instead, the input bit sequence is converted eventually into the serial data signal in which each serial datum is a periodic function of a period of ¼ or 1/N of the input bit rate fs. First, this gives a randomness to the spectrum spread signal although the spreading factor is equal only to N or four. Second, this makes it possible to use the spreading codes of the code length of sixteen or $N^2$ bits to provide a salient feature which can be achieved by spreading codes of a long code length.

While this invention has thus far been described in specific conjunction with a single preferred embodiment thereof, it will now be readily possible for one skilled in the art to put this invention into practice in various manners. For example, it is possible to make each bit of the input bit sequence have a bit structure of, for example, a predetermined number of binary bits. It is furthermore possible to use a spreading factor of only two.

What is claimed is:

1. A method of spectrum spreading an input bit sequence of an input bit rate into a spectrum spread signal of a chip rate which is equal to N times said input bit rate, where N represents an integer which is equal at least to two, comprising the steps of:

serial to parallel converting said input bit sequence over a period of time intervals into N parallel bit sequences, each N parallel bit sequence including N parallel bits, wherein during each time interval N consecutive bits of said input bit sequence corresponding to one of said N parallel bit sequences are arranged in parallel;

parallel to series converting said parallel bit sequences into a serial data sequence of serial data, each serial datum comprising $N^2$ bits in which said N parallel bits corresponding to each of said time intervals are N times repeatedly arranged;

generating spreading codes of a code length of $N^2$ bits at said chip rate; and spectrum spreading said serial data sequence by said spreading codes into said spectrum spread signal.

2. A method as claimed in claim 1, wherein said serial datum comprises N times repetitions of said N consecutive bits of said input bit sequence.

3. A method as claimed in claim 1, wherein:

said serial to parallel converting step converts said input bit sequence into said parallel bit sequences with said time intervals being defined at a lower rate which is equal to said input bit rate divided by N;

said parallel to series converting step converting said parallel bit sequence into said serial data sequence at a higher rate which is equal to N times said input bit rate.

4. A method as claimed in claim 3, wherein:

said serial to parallel converting step comprises the steps of:

producing a shift clock signal at said input bit rate in synchronism with said input bit sequence;

shifting in a shift register said input bit sequence by said shift clock signal with said N consecutive bits shifted as a shifted datum;

producing a lower rate clock signal at said lower rate in synchronism with said shift clock signal; and storing in a memory said shifted datum by said lower rate signal as a stored datum which provides said N parallel bits and provides said parallel bit sequences at said lower rate;

said parallel to series converting step comprising the steps of:

producing a higher rate clock signal at said higher rate in synchronism with said lower rate clock signal; and selecting said stored datum in response to said higher rate clock signal repeatedly N times to produce said serial datum of said serial data sequence.

5. A method as claimed in claim 1, further comprising the step of modulating a carrier signal by said spectrum spread signal into a modulated signal and transmitting said modulated signal as a transmission signal.

6. A spectrum spreading device for spectrum spreading an input bit sequence of an input bit rate into a spectrum spread signal of a chip rate which is equal to N times said input bit rate, where N represents an integer which is equal at least to two, comprising:

serial to parallel converter means for converting said input bit sequence over a period of time intervals into N parallel bit sequences, each N parallel bit sequence including N parallel bits, wherein during each time interval N consecutive bits of said input bit sequence corresponding to one of said N parallel bit sequences are arranged in parallel;

parallel to series converter means for converting said parallel bit sequences into a serial data sequence of serial data, each serial datum comprising $N^2$ bits in which said N parallel bits corresponding to each of said time intervals are N times repeatedly arranged;

code generator means for generating spreading codes of a code length of $N^2$ bits at said chip rate; and spreader means for spectrum spreading said serial data sequence by said spreading codes into said spectrum spread signal.

7. A spectrum spreading device as claimed in claim 6, wherein said parallel to series converter means produces said serial data sequence with each serial datum made to represent said N consecutive bits of input bit sequence repeatedly N times.

8. A spectrum spreading device as claimed in claim 6, wherein:

said serial to parallel converter means converts said input bit sequence into said parallel bit sequences with said time intervals being defined at a lower rate which is equal to said input bit rate divided by N;

said parallel to series converter means converting said parallel bit sequences into said serial data sequence at a higher rate which is equal to N times said input bit rate.

9. A spectrum spreading device as claimed in claim 8, wherein:

said serial to parallel converter means comprises:

shift clock generator means for generating a shift clock signal at said input bit rate in synchronism with said input bit sequence;

shift register means responsive to said shift clock signal for shifting said input bit sequence with said N consecutive bits shifted as a shifted datum at said input bit rate;

first divider means for dividing said shift clock signal by 1/N to produce a low rate clock signal at said lower rate; and memory means responsive to said low rate clock signal for storing said shifted datum as a stored datum which provides said N parallel bits and provides said parallel bit sequences at said lower rate;

said parallel to series converter means comprising:
second divider means for dividing said low rate clock signal by $N^2$ to produce a high rate clock signal at said higher rate; and
selector means responsive to said high rate clock signal for selecting said stored datum repeatedly N times to produce said serial datum and to produce said serial data sequence at said higher rate.

10. A spectrum spreading device as claimed in claim 9, wherein said selector means selects responsive to said higher rate clock signal said stored datum repeatedly N times to produce said serial datum as N repetitions of said N consecutive bits.

11. A spectrum spreading device as claimed in claim 9, wherein said code generator means comprises:
chip clock generator means for generating a chip clock signal at said chip rate; and
a code generator responsive to said high rate clock signal and to said chip clock signal for generating said spreading codes in synchronism with said serial data sequence.

12. A spectrum spreading device as claimed in claim 9, wherein said shift register means comprises:
first through N-th register stages having first through N-th stage output terminals, respectively;
means for supplying said input bit sequence bit by bit to said first register stage;
means responsive to said shift clock signal for shifting said N consecutive bits from said first register stage to said N-th register stage as said shifted datum; and
means responsive to said shift clock signal for producing said parallel bit sequences from said first through said N-th stage output terminals.

13. A spectrum spreading device as claimed in claim 9, said N parallel bits being first through N-th bits, wherein said memory means comprises:
first through N-th memory elements having first through N-th element output terminals, respectively;
means responsive to said low rate clock signal for supplying said parallel bit sequences to said first through said N-th memory elements to store said first through said N-th bits simultaneously in said first through said N-th memory elements at a time as said stored datum; and
means responsive to said low rate clock signal for producing said stored datum from said first through said N-th element output terminals repeatedly N times as said N parallel bits of said parallel bit sequences.

14. A spectrum spreading device as claimed in claim 13, said stored datum being stored in said first through said N-th memory elements as first through N-th stored bits, respectively, wherein said selector means comprises:
selector element means responsive to said high rate clock signal for selecting said first through said N-th element output terminals cyclically N times while said first through said N-th stored bits are stored in said first through said N-th memory elements; and
means for producing said $N^2$ bits while said selector element means cyclically selects said first through said N-th element output terminals to produce said serial data sequence at said higher bit rate.

15. A spectrum spreading transmitter for spectrum spreading an input bit sequence of an input bit rate into a spectrum spread signal of a chip rate and for transmitting said spectrum spread signal as a transmission signal, said chip rate being equal to N times said input bit rate, where N represents an integer which is equal at least to two, said spectrum spreading transmitter comprising:
serial to parallel converter means for converting said input bit sequence over a period of time intervals into N parallel bit sequences, each N parallel bit sequence including N parallel bits, wherein during each time interval N consecutive bits of said input bit sequence corresponding to one of said N parallel bit sequences are arranged in parallel;
parallel to series converter means for converting said parallel bit sequences into a serial data sequence of serial data, each serial datum comprising $N^2$ bits in which said N parallel bits corresponding to each of said time intervals are N times repeatedly arranged;
code generator means for generating spreading codes of a code length of $N^2$ bits at said chip rate;
spreader means for spectrum spreading said serial data sequence by said spreading codes into said spectrum spread signal;
modulator means for modulating a carrier signal by said spectrum spread signal into a modulated signal; and
transmitter means for transmitting said modulated signal as said transmission signal.

16. A spectrum spreading transmitter as claimed in claim 15, wherein:
said serial to parallel converter means converts said input bit sequence into said parallel bit sequences with said time slots defined at a lower rate which is equal to said input rate divided by N;
said parallel to series converting means converting said parallel to series bit sequences into said serial data sequence at a higher rate which is equal to N times said input bit rate.

17. A spectrum spreading transmitter as claimed in claim 16, wherein:
said serial to parallel converter means comprises:
shift clock generator means for generating a shift clock signal at said input bit rate in synchronism with said input bit rate;
shift register means responsive to said shift clock signal for shifting said input bit sequence with said N consecutive bits shifted as a shifted datum at said input bit rate;
first divider means for dividing said shift clock signal by 1/N to produce a low rate clock signal at said lower rate; and
memory means responsive to said low rate clock signal for storing said shifted datum as a stored datum which provides said N parallel bits and provides said parallel bit sequences at said lower rate;
said parallel to series converter means comprising:
second divider means for dividing said low rate clock signal by $N^2$ to produce a high rate clock signal at said higher rate; and
selector means responsive to said high rate clock signal for selecting said stored datum repeatedly N times to produce said serial datum and to produce said serial data sequence at said higher rate;
said code generator means comprising:
chip clock generator means for generating a chip clock signal at said chip rate; and
a code generator responsive to said high rate clock signal and to said chip clock signal for generating said spreading codes in synchronism with said serial data signal.

18. A spectrum spreading transmitter as claimed in claim 16, wherein said shift register means comprises:

first through N-th register stages having first through N-th stage output terminals, respectively;

means for supplying said input bit sequence bit by bit to said first register stage;

means responsive to said shift clock signal for shifting said N consecutive bits from said first register stage to said N-th register stage as said stored datum at said lower rate;

means responsive to said shift clock signal for producing said parallel bit sequences from said first through said N-th stage output terminals.

19. A spectrum spreading transmitter as claimed in claim 16, said N parallel bits being first through N-th bits, wherein said memory means comprises:

first through N-th memory elements having a first through N-th element output terminals, respectively;

means responsive to said low rate clock signal for supplying said parallel bit sequences to said first through said N-th memory elements to store said first through said N-th bits simultaneously in said first through said N-th memory elements at a time as said stored datum; and means responsive to said low rate clock signal for producing said stored datum from said first through said N-th element output terminals as said N parallel bits and for producing said parallel bit sequences at said lower rate.

20. A spectrum spreading transmitter as claimed in claim 19, said stored datum being stored in said first through said N-th memory elements as first through N-th stored bits, respectively, wherein said selector means comprises:

selector element means responsive to said high rate clock signal for selecting said first through said N-th element output terminals cyclically N times while said first through said N-th stored bits are stored in said first through said N-th memory elements; and means for producing said $N^2$ bits while said selector element means cyclically selects said first through said N-th element output terminals to produce said serial data sequence at said higher rate.

\* \* \* \* \*